United States Patent [19]

Ishiwatari

[11] Patent Number: 5,319,488
[45] Date of Patent: Jun. 7, 1994

[54] TERMINAL EQUIPMENT AND OPTICAL COMMUNICATION SYSTEM USING THE SAME

[75] Inventor: Junichi Ishiwatari, Kawasaki, Japan

[73] Assignee: Fujitsu Limited, Kawasaki, Japan

[21] Appl. No.: 852,801

[22] Filed: Mar. 17, 1992

[30] Foreign Application Priority Data

Mar. 20, 1991 [JP] Japan .................................. 3-56574

[51] Int. Cl.$^5$ ..................... H04B 10/02; H04B 10/20
[52] U.S. Cl. ..................................... 359/174; 359/118; 359/135; 359/143; 359/152; 359/165; 359/179; 370/85.8; 340/825.08
[58] Field of Search ............... 359/118, 135, 137, 143, 359/152, 164-165, 174, 176-177, 179, 173; 370/85.8, 85.11; 340/825.08

[56] References Cited

U.S. PATENT DOCUMENTS

4,451,916  5/1984  Casper et al. ....................... 359/118
4,761,832  8/1988  Gade et al. ......................... 359/135

FOREIGN PATENT DOCUMENTS

0170208  2/1986  European Pat. Off. ............ 359/118
0452895  10/1991 European Pat. Off. ............ 359/118

*Primary Examiner*—Richard E. Chilcot, Jr.
*Assistant Examiner*—K. Negash

[57] ABSTRACT

A terminal equipment is connected in a first optical network and connected, via a conductive path, to a predetermined one of a plurality of communication devices connected in a second optical network. The above terminal equipment includes an optical transmitter/receiver unit, a controller for controlling the above predetermined one of the communication devices in order to monitor the communication devices connected in the second optical network, and a selector unit. This selector unit transfers, via a control path coupled to the predetermined one of the communication devices, a poling signal from the first optical network to a specified one of the communication devices addressed by the poling signal, and sends back, to the first optical network, control data which shows a status of the specified one of the communication devices connected in the second optical network and which is received, via the control path, from the specified one of the communication devices.

18 Claims, 9 Drawing Sheets

FIG. I (PRIOR ART)

TERMINAL EQUIPMENT AND OPTICAL COMMUNICATION SYSTEM USING THE SAME

BACKGROUND OF THE INVENTION (1) Field of the Invention

The present invention generally relates to terminal equipment used in an optical communication system, and more particularly to an improvement in a data link process of transferring a variety of information between terminal equipments, between the terminal equipment and a repeater, or between the repeaters.

(2) Description of the Prior Art

FIG. 1 shows a system using a conventional data link system. The system shown in FIG. 1 includes two terminal equipments 1 and 3, and a regenerative repeater 2. The terminal equipment 1 and the repeater 2 are connected to each other via an optical transmission path, and the terminal equipment 3 and the repeater 2 are coupled to each other via an optical transmission path. The terminal equipments 1 and 3 are installed in stations A and C, respectively, and the repeater 2 is installed in a station B. The system thus configured is a so-called point-to-point type optical communication system. The terminal equipments 1 and 3 have controllers 5-1 and 5-3, respectively, and the repeater has a controller 5-2. The controllers 5-1 and 5-2 are connected to each other via a control line, and the controller 5-1 and 5-3 are connected to each other via a control line. Information is transferred between the terminal equipments 1 and 3 and the repeater 2 via the optical transmission paths. Control information used for monitoring operations of the terminal equipments 1 and 3 and the repeater 2 is transferred between the controllers 5-1 and 5-2 and between the controllers 5-1 and 5-3. For example, the controller 5-1 of the terminal equipment 1 collects control data about the repeater 2 and the terminal equipment 3 output by the respective controllers 5-2 and 5-3.

The data link system shown in FIG. 1 cannot be applied to a system based on a back-to-back structure as shown in FIG. 2. As shown in FIG. 2, a terminal equipment 4 having a controller 5-4 is installed in the station C, and a terminal equipment 5 connected to the terminal equipment 4 via an optical transmission path is installed in a station D. The terminal equipment 5 has a controller 5-5. It should be noted that electric signals carrying information are transferred between the terminal equipments 3 and 4. It may be considered that a new optical communication system composed of the terminal equipments 4 and 5 is added to the previously used optical communication system shown in FIG. 1. The above back-to-back system is used when the terminal equipment 3 does not have an afford for accommodating another optical transmission path.

The data link system of the system shown in FIG. 2 is configured as follows. Supervisory devices 6-1-6-5 are connected to the controllers 5-1-5-5, respectively. The supervisory devices 6-1-6-5 monitor the operations of the devices 1-5, respectively. Control information collected at the supervisory devices 6-1-6-5 is transmitted, via respective modems 7-1-7-5, to a modem 8 of a centralized supervisory station. It should be noted that lines connecting between the modems 7-1-7-5 and the modem 8 are provided separately from the optical transmission lines. The control data received via the modem 8 is sent to a master supervisory device 9, which executes a remote control operation on the devices 1-5 on the basis of the collected control data.

However, the system shown in FIG. 2 has a disadvantage in that the master supervisory device 9 is provided outside of the devices 1-5 and needs an additional area for installation.

SUMMARY OF THE INVENTION

It is a general object of the present invention to provide a terminal equipment having a small-scale circuit making it possible to transfer a variety of control data without an external supervisory device as described previously.

The above object of the present invention is achieved by a terminal equipment connected in a first optical network and connected, via a conductive path, to a predetermined one of a plurality of communication devices connected in a second optical network, the terminal equipment comprising: transmitter/receiver means, coupled to the first optical network and the conductive path, for communicating with the first optical network and for communicating with the second optical network via the conductive path; control means, coupled to the transmitter/receiver means, for controlling the predetermined one of the communication devices in order to monitor the communication devices connected in the second optical network; and selector means, coupled to the transmitter/receiver means and the control means, for transferring, via a control path coupled to the predetermined one of the communication devices, a polling signal from the first optical network to a specified one of the communication devices addressed by the polling signal and for sending back, to the first optical network, control data which shows a status of the specified one of the communication devices connected in the second optical network and which is received, via the control path, from the specified one of the communication devices.

Another object of the present invention is to provide an optical communication system having terminal equipments as defined above.

This object of the present invention is achieved by an optical communication system comprising: a first optical network comprising a plurality of first communication devices; a second optical network comprising a plurality of second communication devices; a conductive path connecting a predetermined one of the first communication devices and a predetermined one of the second communication devices; and a predetermined control path connecting the predetermined one of the first communication devices and the predetermined one of the second communication devices. Each of the predetermined one of the first communication devices and the predetermined one of the second communication devices respectively comprises: transmitter/receiver means, coupled to a corresponding one of the first and second optical networks and the conductive path, for communicating with one of the first and second optical networks and for communicating with an other one of the first and second optical networks via the conductive path; control means, coupled to the transmitter/receiver means, for executing a predetermined operation necessary for monitoring communication devices connected in the other one of the first and second optical networks; and selector means, coupled to the transmitter/receiver means and the control means, for transferring, via the control path, a polling signal from the corresponding one of the first and second optical networks to a specified one of the communication devices connected in the other one of the first and second optical networks and addressed by the polling signal and for sending back, to the one of the first and second optical networks, control data which shows a status of the specified one of the communication devices connected in the second optical network and which is received, via the control path, from the specified one of the communication devices.

BRIEF DESCRIPTION OF THE DRAWINGS

The above described and other objects, features and advantages of the present invention will become more apparent from the following detailed description when read in conjunction with the accompanying drawings, in which.

DESCRIPTION OF THE PREFERRED EMBODIMENTS

Figure 1:
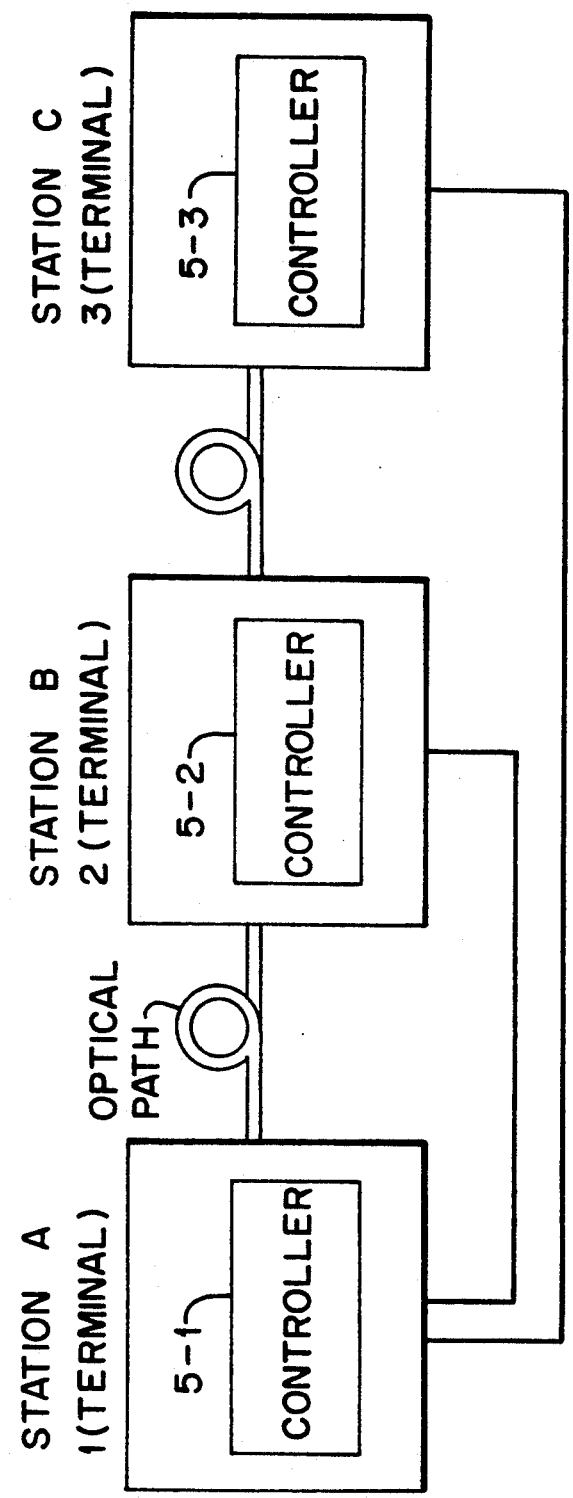
FIG. 1 is a block diagram of an optical communication system using a conventional data link system.
Figure 2:
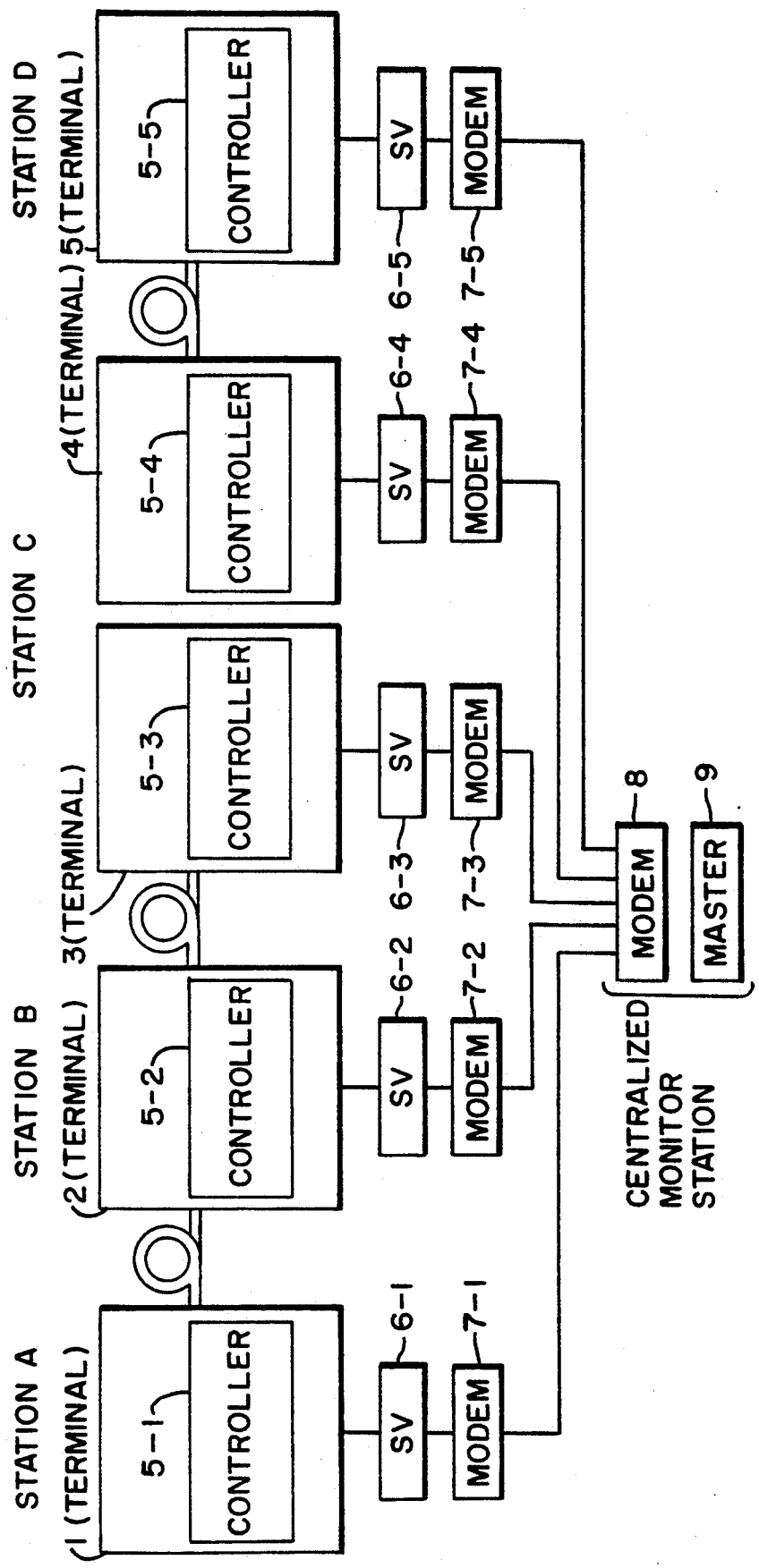
FIG. 2 is a block diagram of an optical communication system using another conventional data link system.
Figure 3:
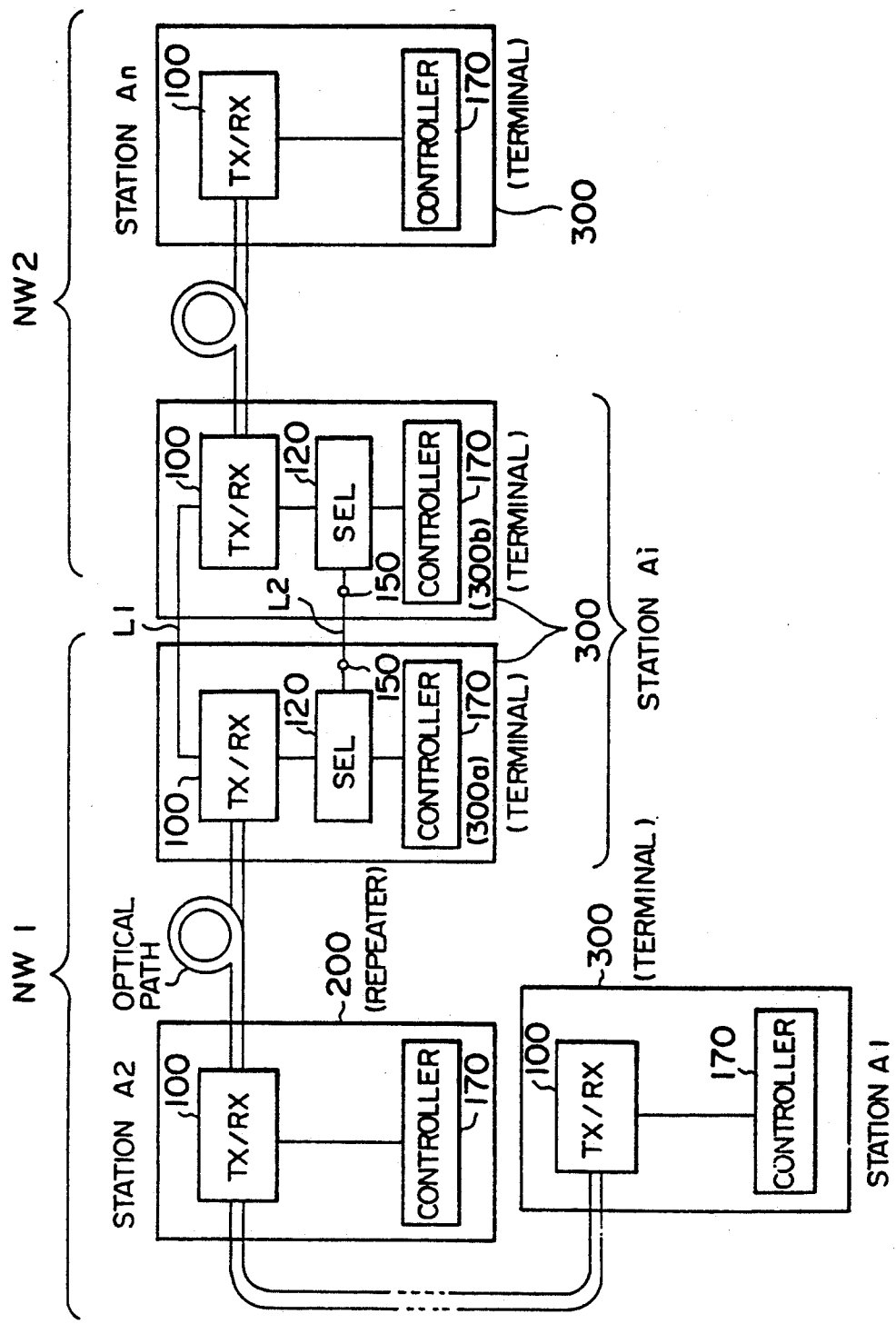
FIG. 3 is a block diagram showing an outline of an embodiment of the present invention.

FIG. 3 shows an outline of an embodiment of the present invention. An optical communication system shown in FIG. 3 has a plurality of stations A1, A2, Ai and An. A terminal equipment 300 is installed in each of the stations A1 and An, and a regenerative repeater 200 is installed in the station A2. Two terminal equipments 300 are installed in the station Ai. The two terminal equipments 300 in the station Ai are connected to each other via a conductive information path L1 which carries main signals having information which is to be transmitted. The terminal equipment 300 in the station A1 is connected to the repeater 200 in the station A2 via an optical transmission path. Further, the terminal equipments 300 in the station Ai are connected to each other via a control path L2. The repeater 200 and one of the terminal equipments 300 in the station Ai are connected to each other via an optical transmission path. The other terminal equipment 300 in the station Ai and the terminal equipment 300 in the station An are connected to each other via an optical transmission path. In the above-mentioned manner, two optical network NW1 and NW2 are connected to each other via the paths L1 and L2. That is, the optical network NW1 comprises the terminal equipment 300 in the station A1, the repeater 200 in the station A2 and the terminal equipment 300a in the station Ai. The optical network NW2 comprises the terminal equipment 300b in the station Ai and the terminal equipment 300 in the station An.

Each terminal equipment 300 installed in the station Ai includes an optical transmitter/receiver unit 100, a selector unit 120 and a controller unit 170. The optical transmitter/receiver unit 100 has a function of multiplexing and demultiplexing main signals (information signals) and a function of converting light signals into electric signals and converting electric signals into light signals. The selectors 120 of the terminal equipments 300 in the station Ai are connected to each other via input/output terminals 150 and the control path L2. The controller 170 controls the entire operation of the terminal equipment 300. Particularly, according to a polling signal inserted in the main signal transmitted via the optical transmission path, the controllers 170 control the respective selectors 120 in a manner as will be described in detail later.

Figure 4:
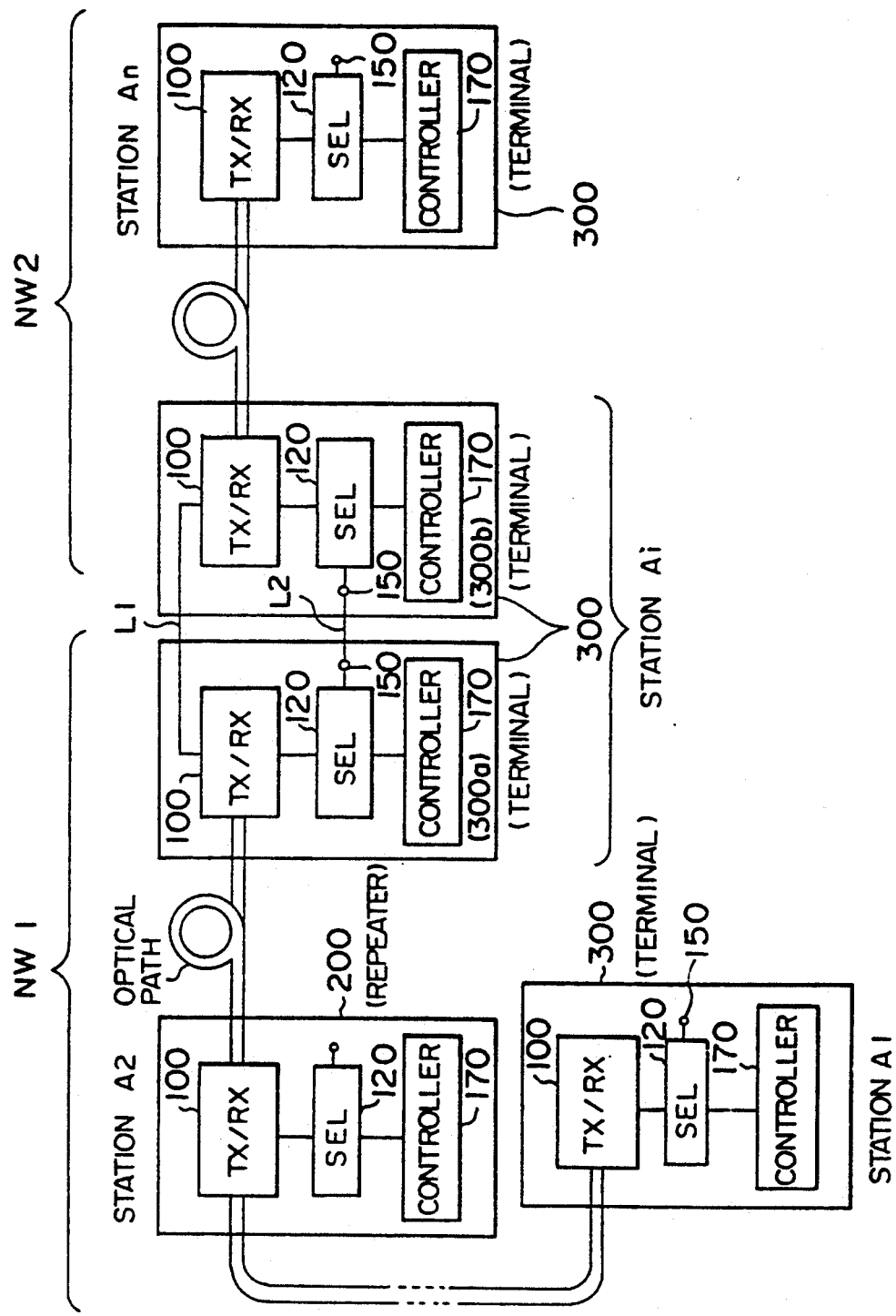
FIG. 4 is a block diagram of a variation of the system shown in FIG. 3.

The terminal equipment 300 in each of the stations A1 and An includes the above optical transmitter/receiver unit 100 and the controller 170. Similarly, the repeater 200 is composed of the optical transmitter/receiver unit 100 and the controller 170. As shown in FIG. 4, it is possible to configure the terminal equipments 300 in the stations A1 and An and the repeater 200 in the same manner as shown in FIG. 3.

It will now be assumed that the station A1 is a master station. When the master station A1 requires to receive control data about the terminal equipment 300 in the station An, the controller 170 in the station A1 outputs a polling signal to the optical transmitter/receiver unit 100, which inserts the polling signal into overhead bits of the main signal (information signal) and converts this main signal into a light signal. The optical transmitter/receiver unit 100 of the repeater 200 in the station A2 receives the light signal transmitted via the optical transmission path, and separates the overhead bits forming the above-mentioned polling signal from the main signal. The separated overhead bits are output to the controller 170, which determines whether or not the polling signal formed by the overhead bits is addressed to the repeater 200. In the example being considered, the polling signal is address to the station An. Thus, the controller 170 of the repeater 200 instructs the optical transmitter/receiver unit 100 to insert the polling signal into the main signal and convert the main signal into a light signal.

The optical receiver/transmitter unit 100 of the terminal equipment 300 in the station Ai receives the above light signal from the repeater 200, and separates the overhead bits from the main signal. Hereinafter, the terminal equipment 300 which faces the repeater is identified by reference numeral 300a, and the other terminal equipment 300 in the station Ai is identified by reference numeral 300b.

The optical transmitter/receiver unit 100 of the terminal equipment 300a converts the optical main signal into an electric signal and separates the polling signal from the electric signal. The separated polling signal is output to the controller 170 of the terminal equipment 300a via its selector 120. The controller 170 of the terminal equipment 300a determines that the received polling signal is addressed to the station An. The controller 170 of the terminal equipment 300a controls the selector unit 120 so that the controller 170 is connected to the input/output terminal 150. After this, the controller 170 of the terminal equipment 300a outputs the polling signal to the input/output terminal 150 thereof via the selector unit 120. The polling signal is then transferred to the input/output terminal 150 of the terminal equipment 300b via the path separated from the optical transmission path.

The terminal equipment 300b in the station Ai collects control data about the operation of the terminal equipment 300 in the station An by outputting a polling signal to the station An via the optical transmission path. This polling procedure for collecting the control data about the terminal equipment 300 in the station An is, for example, periodically carried out. The control data about the station An is stored in a memory in the controller 170 of the terminal equipment 300b.

The polling signal transmitted from the terminal equipment 300a is received by the controller 170 of the terminal equipment 300b via its input/output terminal 150 and its selector 120. In response to the polling signal, the controller 170 of the terminal equipment 300b reads out the control data from the built-in memory, and transfers the control data in the reverse route. That is, the control data is transferred to the controller 170 of the terminal equipment 300a via the two selectors 120, and then output to the optical transmission path connected to the repeater 200 via the selector 120 and the optical transmitter/receiver unit 100 of the terminal equipment 300a. Then, the control data is transferred to the controller 170 of the station A1 via the optical transmission path. In this manner, the controller 170 of the master station can obtain the control data about the terminal equipment in the station An. If one of the stations other than the station A1 functions as a master station, the system will operate in the same manner as described above.

Figure 5:
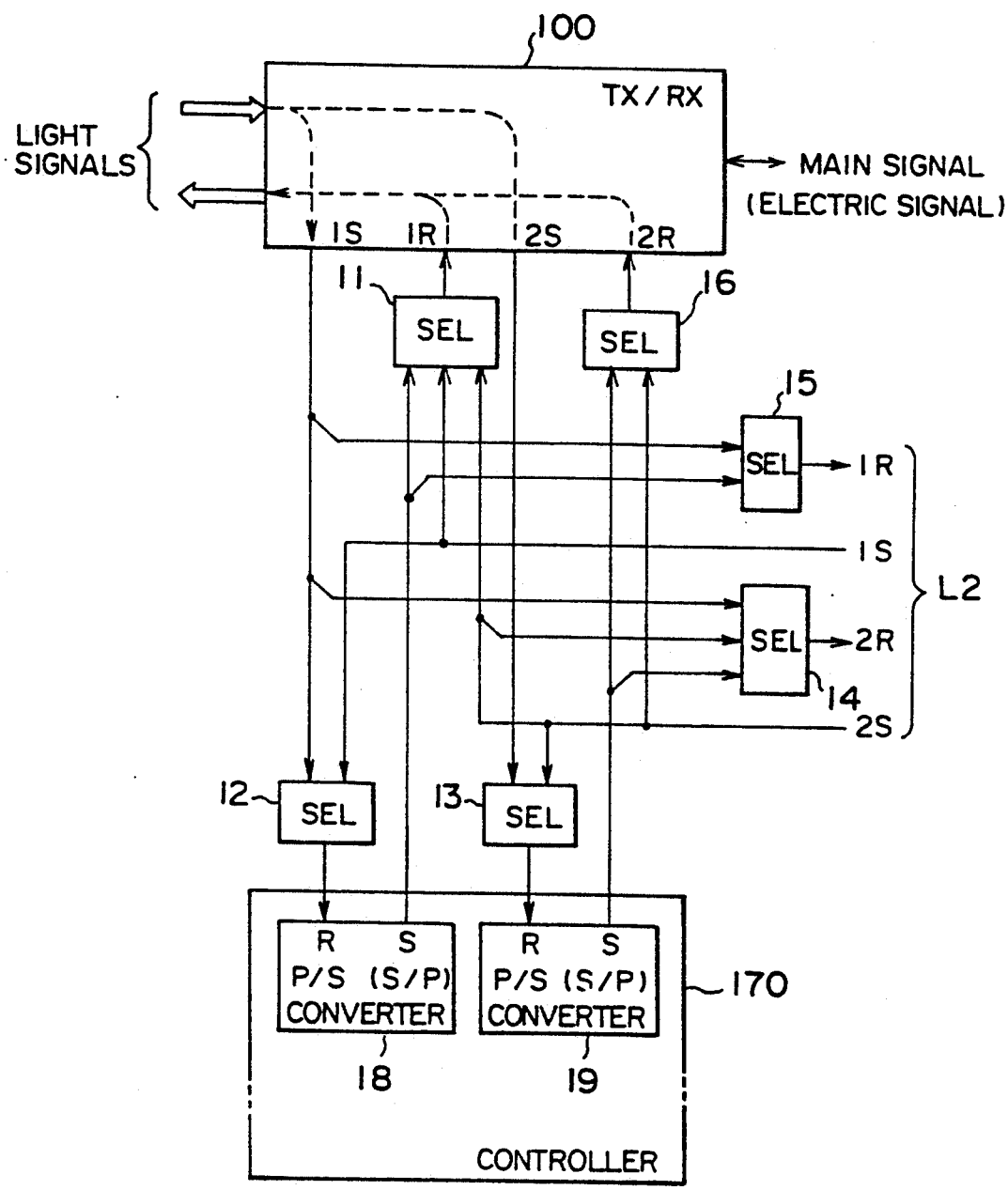
FIG. 5 is a block diagram of a terminal equipment used in the system shown in FIG. 3 or FIG. 4.

FIG. 5 is a block diagram of each of the terminal equipments 300a and 300b installed in the station Ai shown in FIG. 3 or FIG. 4. In FIG. 5, parts which are the same as those shown in the previous figures are given the same reference numerals. The selector unit 120 includes selectors 11–16. The selector 12 has two input terminals, one of which is connected to a terminal 1s of the optical transmitter/receiver unit 100, and the other of which is connected to one of three input terminals of the selector 11 and a terminal 1S. An output terminal of the selector 12 is connected to a terminal R of a serial-to-parallel/parallel-to-serial converter 18 of the controller 170. A terminal S of the converter 18 is connected to one of the three input terminals of the selector 11 and one of two input terminals of the selector 15. One of the input terminals of the selector 11 is connected to one of two input terminals of the selector 13 and one of three input terminals of the selector 14. An output terminal of the selector 11 is connected to a terminal 1R of the unit 100. One of the input terminal of the selector 13 is connected to a terminal 2S of the unit 100. An output terminal of the selector 13 is connected to a terminal R of a serial-to-parallel/parallel-to-serial converter 19 of the controller 170. A terminal S of the converter 19 is connected to one of two input terminals of the selector 16, and one of the three input terminal of the selector 14. An output terminal of the selector 16 is connected to a terminal 2R of the unit 100. The terminal 1S of the unit 100 is connected to one of the two input terminals of the selector 15 and one of the three input terminals of the selector 14. A terminal S2 is connected to one of the three input terminals of the selector 11 and one of the three input terminals of the selector 14, and one of the two input terminals of the selector 13. An output terminal of the selector 15 is connected to a terminal 1R. An output terminal of the selector 14 is connected to a terminal 2R. The terminal 1R connected to the selector 15 is connected to the terminal 1S of the other terminal equipment (not shown in FIG. 5), and the terminal 2R connected to the selector 14 is connected to the terminal 2S of the other terminal equipment (not shown in FIG. 5).

Figure 6:
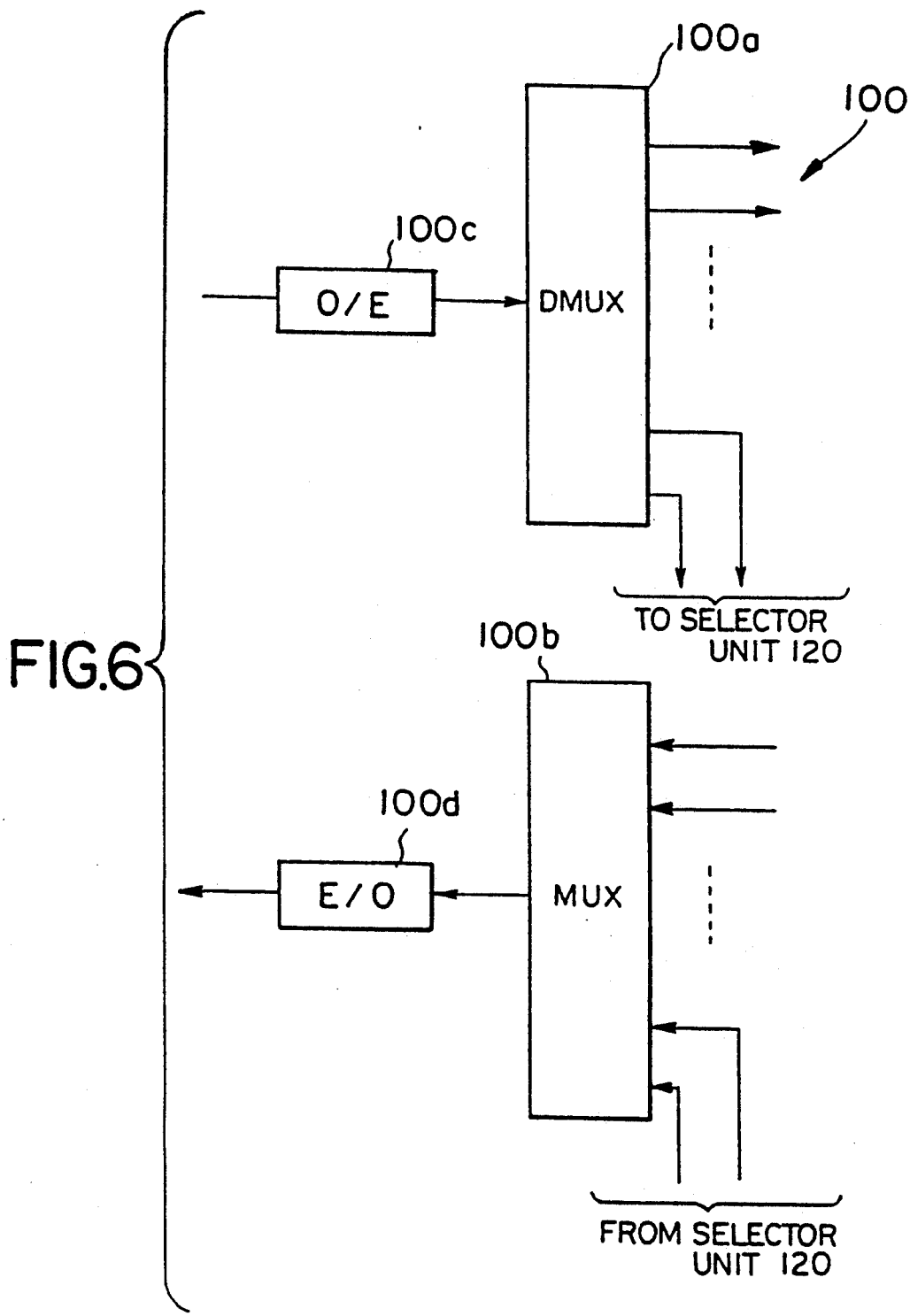
FIG. 6 is a block diagram of an optical transmitter/receiver unit shown in FIG. 5.

As shown in FIG. 6, the optical transmitter/receiver unit 100 includes a demultiplexer (DMUX) 100a, a multiplexer (MUX) 100b, an opto-electric converter (O/E) 100c and an electro-optical converter (E/O) 100d. The opto-electric converter 100c converts a light signal into an electric signal. The demultiplexer 100a separates electrical main signals from control bits, such as overhead bits, frame bits and so on. The mutiplexer 100b multiplexes electric main signals and control bits, and generates a multiplexed electric signal. The electro-optical converter 100d converts the received electric signal into a light signal.

Figure 7:
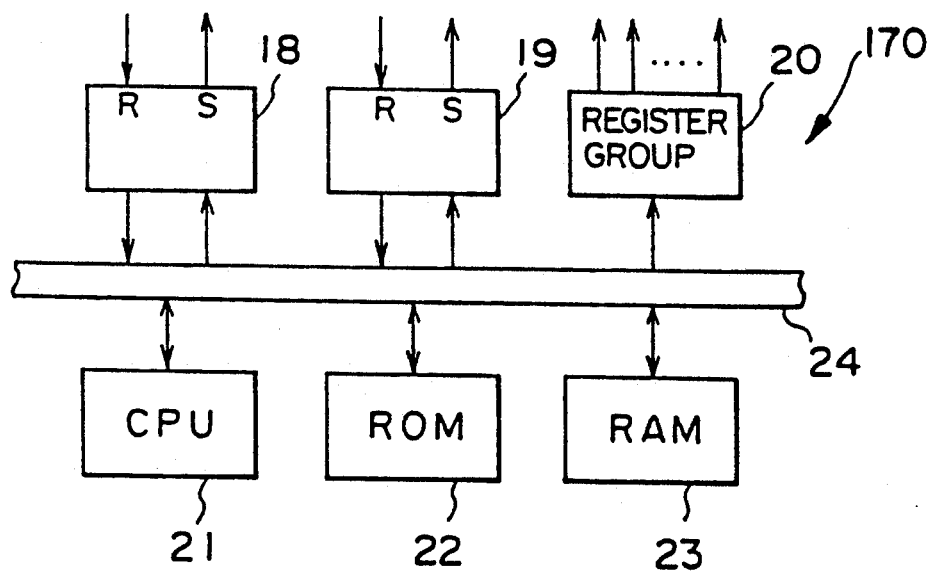
FIG. 7 is a block diagram of a controller shown in FIG. 5.

FIG. 7 shows the structure of the controller 170 shown in FIG. 5. In addition to the aforementioned converters 18 and 19, the controller 170 includes a register group 20, a CPU 21, a RAM 22, a ROM 23 and a bus 24. The register group 20 includes a plurality of registers associated with the selectors 11–16 shown in FIG. 5. The CPU 21 controls the entire operation of the controller 170. Further, the CPU 21 writes bit data for controlling the selectors 11–16 into the registers of the register group 20. The ROM 22 stores programs necessary for the control operation of the CPU 21. The RAM 23 is used for temporarily storing data.

It will now be assumed that the station A1 functions as a master station, and the terminal equipments 300a and 300b in the station Ai and the terminal equipment 300 in the station An function as slave station. If the controller 170 of the terminal equipment 300 in the station A1 sends the polling signal to the controller 170 of the terminal equipment 300a in the station Ai, the polling signal (which is a serial signal) output by the controller 170 of the terminal equipment 300 in the station A1 is applied to the optical transmitter/receiver unit 100 thereof. A multiplexer of this optical transmitter/receiver unit 100 (which is the same as that shown in FIG. 6) inserts the polling signal into the overhead bits of a main signal which is not to be transmitted.

Figure 8:
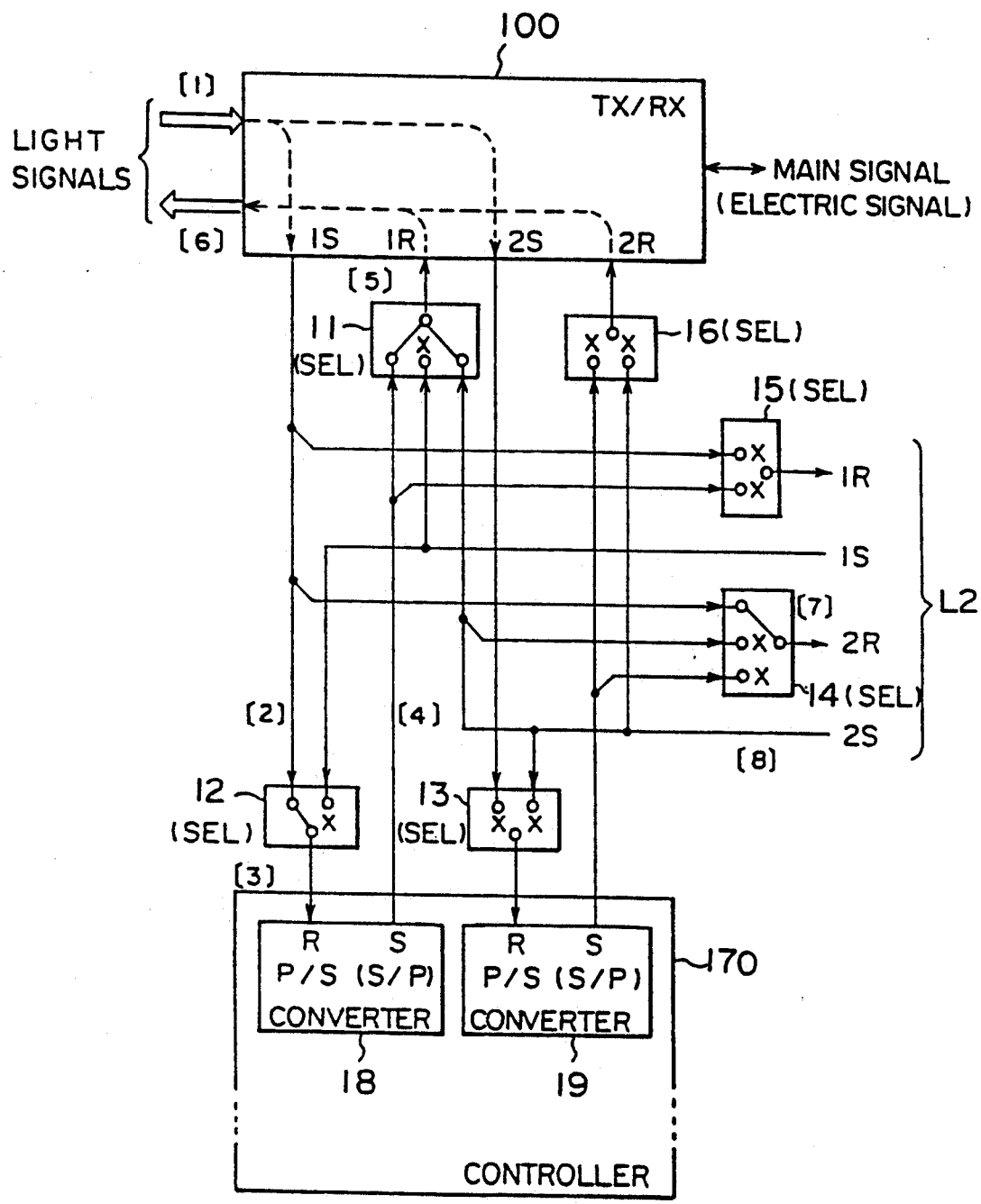
FIGS. 8 and 9 are block diagrams showing the operation of the system shown in FIG. 3.

The main signal with the polling signal added thereto passes through the optical transmission path, the repeater 200 and the optical transmission path, and is received by the optical transmitter/receiver unit 100 of the terminal equipment 300a, as indicated by [1] shown in FIG. 8. The received main signal is converted into an electric signal by the opto-electric converter 100c shown in FIG. 6. The converted electric signal is then applied to the demultiplexer 100a, which separates the polling signal from the received electric main signal. The separated polling signal is then applied to the converter 18 of the controller 170 in the terminal equipment 300a via path [2], the selector 12 and path [3] shown in FIG. 8.

The converter 18 converts the received serial polling signal into a parallel signal, which is then written into the RAM 23 (FIG. 7) under the control of the CPU 21. The CPU 21 determines whether or not the received polling signal is addressed to the terminal equipment 300a in the station Ai. When the result of this determination is affirmative, the CPU 21 outputs a parallel acknowledgement signal to the converter 18. The converter 18 converts the parallel acknowledgement signal into a serial signal, which is then applied, via the terminal 1R (FIG. 8), to the multiplexer 100b (FIG. 6) via path [4] and the selector 11 shown in FIG. 8.

The multiplexer 100b of the optical transmitter/receiver unit 100 inserts the acknowledgement signal into the overhead bits of the main signal which is to be transmitted. Then, the main signal with the acknowledgement signal added thereto is converted into a light signal by the electro-optic converter 100d, and transmitted to the optical transmission path as indicated by [6] shown in FIG. 8. The optical transmitter/receiver unit 100 in the station A1 receives the main signal via the repeater 200, and separates the acknowledgement signal therefrom by the multiplexer provided therein after it is converted into an electric signal. The controller 170 in the station A1 receives the acknowledgement signal from the optical transmitter/receiver unit 100, and confirms that the polling signal has been duly received by the controller 170 of the terminal equipment 300a in the station Ai. After this, control data about the terminal 300a is sent to the station A1. In the above manner, the station A1 manages the terminal equipment 300a in the station Ai.

Figure 9:
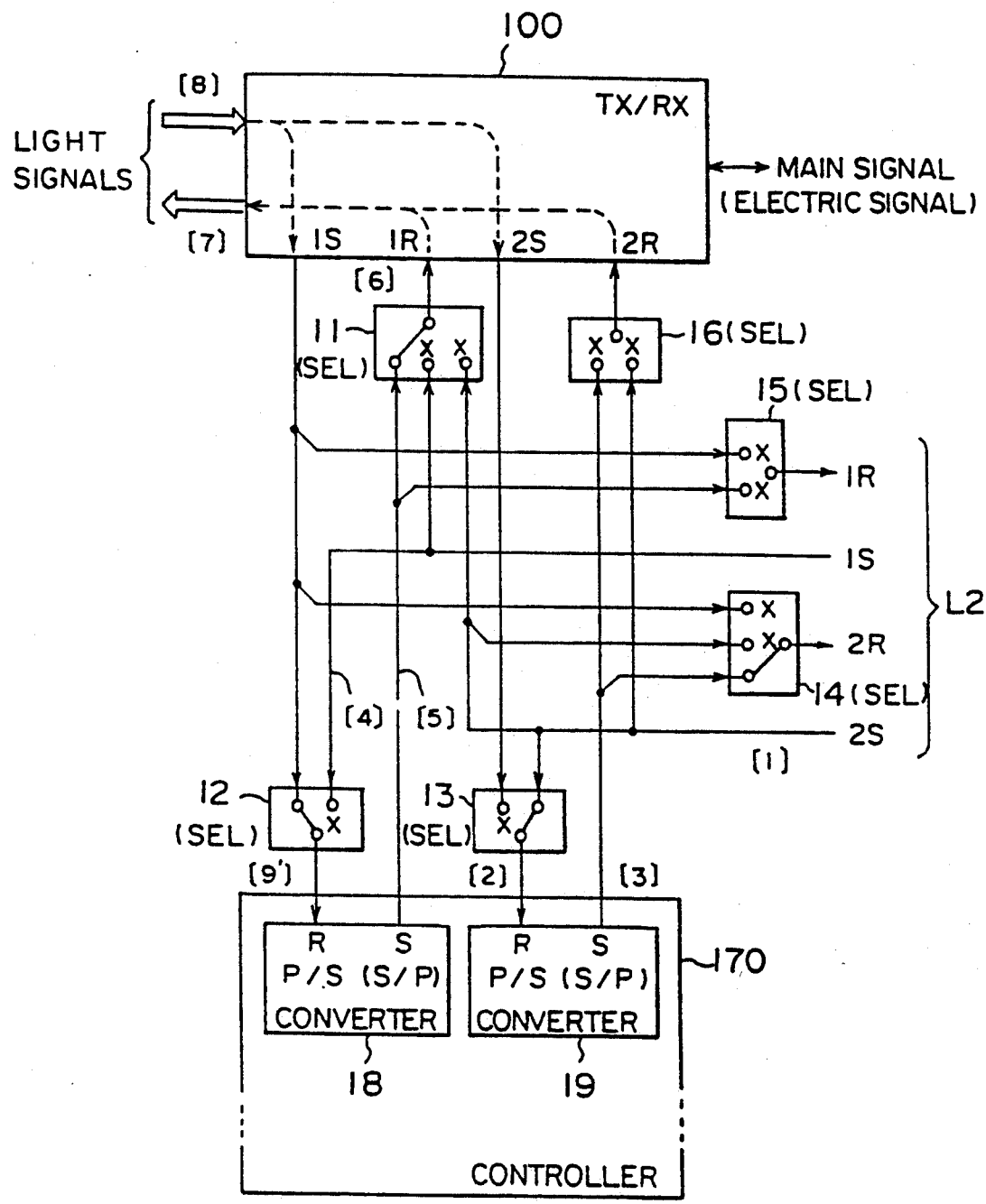

When the controller 170 of the terminal equipment 300 in the master station A1 generates a request to send the polling signal to the controller 170 of the terminal equipment in the station An, the polling signal is sent to the controller 170 of the terminal equipment 300a in the station Ai in the same manner as described previously. The CPU 21 of the controller 170 of the terminal equipment 300a determines that the received polling signal is not addressed to the terminal equipment 300a. The polling signal in electric form is transferred to the terminal 2R via path [2] and the selector 14 shown in FIG. 8. Then, the polling signal is applied to the terminal 2S of the terminal equipment 300b shown in FIG. 9, and transferred to the converter 19 of the terminal equipment 300b via path [1], the selector 13, and path [2]. The converter 19 converts the serial polling signal from the terminal equipment 300a into a parallel signal, which is then output to the CPU 21 of the terminal equipment 300b. The CPU 21 determines whether or not the received polling signal is addressed to the terminal equipment 300b. In the case being considered, the result of this determination is affirmative. Thus, the CPU 21 sends a parallel acknowledgement signal to the converter 19 via the bus 24. The parallel acknowledgement signal is converted into a serial acknowledgement signal by the converter 19 and sent to the terminal 2R via path [3], the selector 14 and path [4] shown in FIG. 9.

The serial acknowledgement signal from the terminal equipment 300b is applied to the terminal 2S shown in FIG. 8, and sent to the 1R terminal of the optical transmitter/receiver unit 100 via path [8], the selector 11 and path [5]. The acknowledgement signal is inserted, by the multiplexer 100b of the terminal equipment 100a shown in FIG. 6, into the overhead bits of the main signal which is to be transmitted. The main signal with the acknowledgement signal added thereto is converted into a light signal by the electro-optic converter 100d, and output to the optical transmission path indicated by [6] shown in FIG. 8. Then, the acknowledgement signal is sent to the controller 170 of the terminal equipment 300 in the master station A1. After this, control (supervisory) data about the terminal equipment 300b is sent to the controller 170 in the master station A1.

When the controller 170 of the terminal equipment 300 in the master station A1 sends the polling signal to the terminal equipment 300 in the station An in order to obtain control data thereon, the polling signal is transferred to the controller 170 of the terminal equipment 300b in the same manner as described previously. For example, the controller 170 of the terminal equipment 300b periodically requests, by the polling procedure, the controller 170 in the station An to send back control data about the terminal equipment 300 in the station An. The polling signal is sent to the station An via the optical transmission path. The received control data is stored in the RAM 23 (FIG. 7) of the controller 170 of the terminal equipment 300b.

In response to the polling signal from the master station A1, the controller 170 of the terminal equipment 300b returns the acknowledgement signal to the master station A1 in the same manner as has been described previously. After this, the control data is read out from the RAM 23 of the controller 170 of the terminal equipment 300b, and sent to the controller 170 in the master station A1 in the same manner as has been described previously.

In the above-mentioned manner, the master station A1 manages not only the repeater 200 and all the terminal equipments 300, 300a and 300b in the stations A1, Ai and An. It is also possible for the master station A1 to manage a terminal equipment connected to an optical transmission path branched from an optical transmission path to which the station Ai, for example, is connected. In this case, the polling procedure and acknowledgment procedure are the same as those described in the foregoing. One of the terminal equipments other than the terminal equipment 300 installed in the station A1 can function as a master station. Each of the selectors 11–16 are controlled by data registered in the register group 20 under the control of the CPU 21.

The present invention is not limited to the specifically disclosed embodiments, and variations and modifications may be made without departing from the scope of the present invention.

What is claimed is:

1. A terminal equipment connected in a first optical network and connected, via a conductive path, to a predetermined one of a plurality of communication devices connected in a second optical network, said terminal equipment comprising:

transmitter/receiver means, coupled to said first optical network for communicating with said first optical network and to said conductive path for communicating with said second optical network via said conductive path;

control means, coupled to said transmitter/receiver means, for controlling said predetermined one of the communication devices in order to monitor the communications devices connected in said second optical network; and selector means, coupled to said transmitter/receiver means and said control means, for transferring, via a control path coupled to said predetermined one of the communication devices in said second network, a polling signal from said first optical network to a specified one of said communication devices addressed by said polling signal and for sending back, to said first optical network, control data which is indicative of a status of said specified one of the communication devices connected in said second optical network and which is received, via said control path, from said specified one of the communication devices.

2. A terminal equipment as claimed in claim 1, wherein said transmitter/receiver means comprises conversion means for converting a light signal from said first optical network into an electric signal and for converting an electrical signal received from said predetermined one of the communication devices into a light signal.

3. A terminal equipment as claimed in claim 1, wherein said transmitter/receiver means comprises multiplexer/demultiplexer means for demultiplexing a light signal from said first optical network and multiplexing signal which are to be sent to said first optical network.

4. A terminal equipment as claimed in claim 1, wherein said terminal equipment and said predetermined one of said communication devices are installed in a single station.

5. A terminal equipment connected in a first optical network and connected, via a conductive path, to a predetermined one of a plurality of communication devices connected in a second optical network, said terminal equipment comprising:

transmitter/receiver means, coupled to said first optical network for communicating with said first optical network and to said conductive path for communicating with said second optical network via said conductive path;

control means, coupled to said transmitter/receiver means, for controlling said predetermined one of the communication devices in order to monitor the communication devices connected in said second optical network; and selector means, coupled to said transmitter/receiver means and said control means, for transferring, via a control path coupled to said predetermined one of the communication devices in said second network, a polling signal from said first optical network to a specified one of said communication devices addressed by said polling signal and for sending back, to said first optical network, control data which is indicative of a status of said specified one of the communication devices connected in said second optical network and which is received, via said control path, from said specified one of the communication devices, wherein said control means comprises means for determining whether or not said polling signal is addressed to said terminal equipment and for controlling said selector means so that said polling signal is transferred, via said control path, to said predetermined one of said communication devices when it is determined that said polling signal is not addressed to said terminal equipment.

6. A terminal equipment connected in a first optical network and connected, via a conductive path, to a predetermined one of a plurality of communication devices connected in a second optical network, said terminal equipment comprising:

transmitter/receiver means, coupled to said first optical network for communicating with said first optical network and to said conductive path for communicating with said second optical network via said conductive path;

control means, coupled to said transmitter/receiver means, for controlling said predetermined one of the communication devices in order to monitor the communication devices connected in said second optical network; and selector means, coupled to said transmitter/receiver means and said control means, for transferring, via a control path coupled to said predetermined one of the communication devices in said second network, a polling signal from said first optical network to a specified one of said communication devices addressed by said polling signal and for sending back, to said first optical network, control data which is indicative of a status of said specified one of the communication devices connected in said second optical network and which is received, via said control path, from said specified one of the communication devices, wherein said transmitter/receiver means comprises multiplexer/demultiplexer means for demultiplexing a light signal from said first optical network and multiplexing signals which are to be send to said first optical network, and wherein said multiplexer/demultiplexer means comprises means for separating said polling signal from a light signal from said first optical network and for inserting said control data in a light signal which is to be sent to said first optical network.

7. A terminal equipment connected in a first optical network and connected, via a conductive path, to a predetermined one of a plurality of communication devices connected in a second optical network, said terminal equipment comprising:

transmitter/receiver means, coupled to said first optical network for communicating with said first optical network and to said conductive path for communicating with said second optical network via said conductive path;

control means, coupled to said transmitter/receiver means, for controlling said predetermined one of the communication devices in order to monitor the communication devices connected in said second optical network; and selector means, coupled to said transmitter/receiver means and said control means, for transferring, via a control path coupled to said predetermined one of the communication devices in said second network, a polling signal from said first optical network to a specified one of said communication devices addressed by said polling signal and for sending back, to said first optical network, control data which is indicative of a status of said specified one of the communication devices connected in said second optical network and which is received, via said control path, from said specified one of the communication devices, wherein said polling signal comprises a serial signal, and said control data comprises a serial signal.

8. A terminal equipment connected in a first optical network and connected, via a conductive path, to a predetermined one of a plurality of communication devices connected in a second optical network, said terminal equipment comprising:

transmitter/receiver means, coupled to said first optical network for communicating with said first optical network and to said conductive path for communicating with said second optical network via said conductive path;

control means, coupled to said transmitter/receiver means, for controlling said predetermined one of the communication device in order to monitor the communication devices connected in said second optical network; and selector means, coupled to said transmitter/receiver means and said control means, for transferring, via a control path coupled to said predetermined one of the communication devices in said second network, a polling signal from said first optical network to a specified one of said communication devices addressed by said polling signal and for sending back, to said first optical network, control data which is indicative of a status of said specified one of the communication devices connected in said second optical network and which is received, via said control path, from said specified one of the communication devices, wherein said terminal equipment further comprises memory means for storing the control data from said specified one of the communication devices; and said control data is read out from said memory means in response to said polling signal.

9. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication devices connected in said second optical network and which is received, via said control path, from said specified one of the communication devices.

10. An optical communication system as claimed in claim 9, wherein:
said transmitter/receiver means of said corresponding one of the first communication devices comprises first means for converting a light signal from said first optical network into an electrical signal and for converting an electrical signal received from said predetermined one of the second communication devices into a light signal; and said transmitter/receiver means of said corresponding one of the second communication devices comprises second means for converting a light signal from said second optical network into an electric signal and for converting an electric signal received from said predetermined one of the first communication devices into a light signal.

11. An optical communication system as claimed in claim 9, wherein:
said transmitter/receiver means of said predetermined one of the first communication devices comprises multiplexer/demultiplexer means for demultiplexing a light signal from said first optical network and multiplexing signals which are to be sent to said first optical network; and said transmitter/receiver means of said predetermined one of the second communication devices comprises multiplexer/demultiplexer means for demultiplexing a light signal from said second optical network and multiplexing signals which are to be sent to said second optical network.

12. An optical communication system as claimed in claim 9, wherein said predetermined one of the first communication devices and said predetermined one of the second communication devices are installed in a single station.

13. An optical communication system as claimed in claim 9, wherein said first communication devices comprises a repeater, and said second communication devices comprises a repeater.

14. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication devices connected in said second optical network and which is received, via said control path, from said specified one of the communication devices, wherein said predetermined one of the first communication devices comprises first means for determining whether or not said polling signal is addressed to said predetermined one of the first communication devices and for controlling said selector means so that said polling signal is transferred, via said control path, to the second optical network when it is determined that said polling signal is not addressed to said predetermined one of the first communication devices; and said predetermined one of the second communication devices comprises second means for determining whether or not said polling signal is addressed to said predetermined one of the second communication devices and for controlling said selector means so that said polling signal is transferred, via said control path, to the first optical network when it is determined that said polling signal is not addressed to said predetermined one of the second communication devices.

15. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication devices connected in said second optical network and which is received, via said control path, from said specified one of the communication devices, wherein
said transmitter/receiver means of said predetermined one of the first communication devices comprises multiplexer/demultiplexer means for demultiplexing a light signal from said first optical network and multiplexing signals which are to be sent to said first optical network; and said transmitter/receiver means of said predetermined one of second communication devices comprises multiplexer/demultiplexer means comprises means for demultiplexing a light signal from said second optical network and multiplexing signals which are to be sent to said second optical network, and wherein said multiplexer/demultiplexer means of said transmitter/receiver means of said predetermined one of the first communication devices comprises first means for separating said polling signal from a light signal transferred from said first optical network and for inserting said control data into a light signal which is to be sent to said first optical network; and said multiplexer/demultiplexer means of said transmitter/receiver means of said predetermined one of the second communication devices comprises second means for separating said polling signal from a light signal transferred from said second optical network and for inserting said control data into a light signal which is to be sent to said second optical network.

16. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication devices connected in said second optical network and which is received, via said control path, from said specified one of the communication devices, wherein said polling signal comprises a serial signal, and said control data comprises a serial signal.

17. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication devices connected in said second optical network and which is received, via said control path, from said specified one of the communication devices,
wherein said predetermined one of the first communication devices comprises first memory means for storing the control data from said second optical network; and
said predetermined one of the second communication devices comprises second memory means for storing the control data from said first optical network.

18. An optical communication system comprising:
a first optical network comprising a plurality of first communication devices;
a second optical network comprising a plurality of second communication devices;
a conductive path connecting a predetermined one of the first communication devices and a predetermined one of the second communication devices; and
a control path connecting said predetermined one of the first communication devices and said predetermined one of the second communication devices to each other,
wherein each of said predetermined one of the first communication devices and said predetermined one of the second communication devices, respectively, comprises:
transmitting/receiver means, coupled to a corresponding one of said first and second optical networks for communicating with one of said first and second optical networks and to said conductive path for communicating with another one of said first and second optical networks via said conductive path;
control means, coupled to said transmitter/receiver means and being operative for monitoring communication devices connected in the other one of said first and second optical networks; and
selector means, coupled to said transmitter/receiver means and control means, for transferring, via said control path, a polling signal from said corresponding one of the first and second optical networks to a specified one of the communication devices connected in the other one of the first and second optical networks and addressed by said polling signal and for sending back, to said one of the first and second optical networks, control data indicative of a status of said specified one of the communication device connected in said second optical network and which is received, via said control path, from said specified one of the communication devices,
wherein one of said first communication devices is a master terminal equipment which generates said polling signal.

* * * * *